(12) United States Patent
Kakishima et al.

(10) Patent No.: US 12,113,591 B2
(45) Date of Patent: Oct. 8, 2024

(54) USER EQUIPMENT AND COMMUNICATION METHOD

(71) Applicant: NTT DOCOMO, INC., Tokyo (JP)

(72) Inventors: Yuichi Kakishima, Tokyo (JP); Yuki Matsumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 354 days.

(21) Appl. No.: 17/613,445

(22) PCT Filed: May 31, 2019

(86) PCT No.: PCT/JP2019/021882
§ 371 (c)(1),
(2) Date: Nov. 22, 2021

(87) PCT Pub. No.: WO2020/240869
PCT Pub. Date: Dec. 3, 2020

(65) Prior Publication Data
US 2022/0224379 A1  Jul. 14, 2022

(51) Int. Cl.
*H04B 7/0426* (2017.01)
*H04W 16/28* (2009.01)
*H04W 56/00* (2009.01)

(52) U.S. Cl.
CPC ............ *H04B 7/043* (2013.01); *H04W 16/28* (2013.01); *H04W 56/001* (2013.01)

(58) Field of Classification Search
None
See application file for complete search history.

(56) References Cited

U.S. PATENT DOCUMENTS

| | | | |
|---|---|---|---|
| 11,539,495 B2* | 12/2022 | Wu | H04L 5/0078 |
| 2018/0368187 A1* | 12/2018 | Jung | H04W 74/006 |
| 2020/0053738 A1 | 2/2020 | Harada et al. | |
| 2020/0154402 A1* | 5/2020 | Lee | H04W 56/001 |
| 2020/0205131 A1* | 6/2020 | Lee | H04W 56/001 |
| 2020/0374806 A1* | 11/2020 | Manolakos | H04W 52/325 |
| 2020/0374871 A1* | 11/2020 | Liu | H04W 56/0015 |
| 2021/0051597 A1* | 2/2021 | Manolakos | H04W 52/242 |
| 2021/0120592 A1* | 4/2021 | Takahashi | H04W 48/12 |
| 2021/0212007 A1* | 7/2021 | Liu | H04W 56/0015 |
| 2021/0297135 A1* | 9/2021 | Kim | H04L 5/0062 |

(Continued)

FOREIGN PATENT DOCUMENTS

WO  2018/173232 A1  9/2018

OTHER PUBLICATIONS

International Search Report issued in PCT/JP2019/021882 on Jul. 2, 2019 (5 pages).

(Continued)

*Primary Examiner* — Faiyazkhan Ghafoerkhan
(74) *Attorney, Agent, or Firm* — Osha Bergman Watanabe & Burton LLP

(57) ABSTRACT

User equipment includes a control unit configured to determine a spatial reception parameter of a channel, based on quasi co-location (QCL) information related to a synchronization signal or a reference signal; and a reception unit configured to receive the channel based on the determined spatial reception parameter. In the QCL information, a QCL parameter applied to a source signal is partially or entirely different from a QCL parameter applied to a destination signal.

4 Claims, 10 Drawing Sheets

EXAMPLE 1: SSB→Beam 1-4, TRS→Beam 1-4

EXAMPLE 2: SSB→Beam 1-4, TRS→Beam 1A-4D
(MULTI-STEP BEAM CONTROL)

(56) References Cited

U.S. PATENT DOCUMENTS

| | | | |
|---|---|---|---|
| 2022/0078718 A1* | 3/2022 | Hoshino | H04W 72/02 |
| 2022/0124633 A1* | 4/2022 | Hoshino | H04W 16/28 |
| 2022/0132430 A1* | 4/2022 | Hoshino | H04L 5/0051 |
| 2022/0132436 A1* | 4/2022 | Hoshino | H04L 5/0048 |
| 2022/0158715 A1* | 5/2022 | Bishwarup | H04W 76/19 |
| 2022/0224379 A1* | 7/2022 | Kakishima | H04W 88/02 |
| 2022/0272639 A1* | 8/2022 | Manolakos | H04W 52/242 |

OTHER PUBLICATIONS

Written Opinion of the International Searching Authority issued in PCT/JP2019/021882 on Jul. 2, 2019 (4 pages).

Huawei, HiSilicon; "Physical layer procedure for NR positioning"; 3GPP TSG RAN WG1 #97, R1-1906055; Reno, USA: May 13-17, 2019 (14 pages).

NTT DOCOMO, INC.; "Discussion on multi-beam enhancement"; 3GPP TSG RAN WG1 #97, R1-1906225; Reno, USA; May 13-17, 2019 (24 pages).

3GPP TS 38.300 V15.5.0; "3rd Generation Partnership Project; Technical Specification Group Radio Access Network; NR; NR and NG-RAN Overall Description; Stage 2 (Release 15)"; Mar. 2019 (97 pages).

3GPP TS 38.211 V15.5.0; "3rd Generation Partnership Project; Technical Specification Group Radio Access Network; NR; Physical channels and modulation (Release 15)" Mar. 2019 (96 pages).

\* cited by examiner

| index | 1 | 2 | 3 | 4 | 5 | 6 | 7 | 8 |
|---|---|---|---|---|---|---|---|---|
| Tx beam | 1 | 2 | 3 | 4 | 1 | 2 | 3 | 4 |
| Rx beam | 1 | 1 | 1 | 1 | 2 | 2 | 2 | 2 |

FIG.5
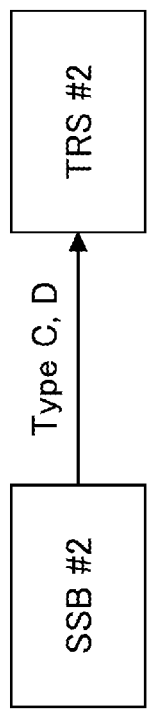
EXAMPLE 1: SSB→Beam 1-4, TRS→Beam 1-4
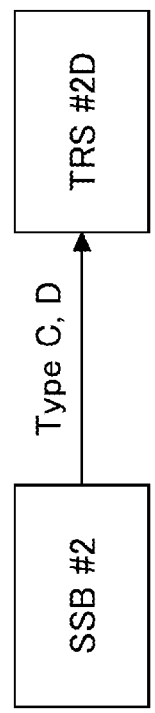
EXAMPLE 2: SSB→Beam 1-4, TRS→Beam 1A-4D
(MULTI-STEP BEAM CONTROL)
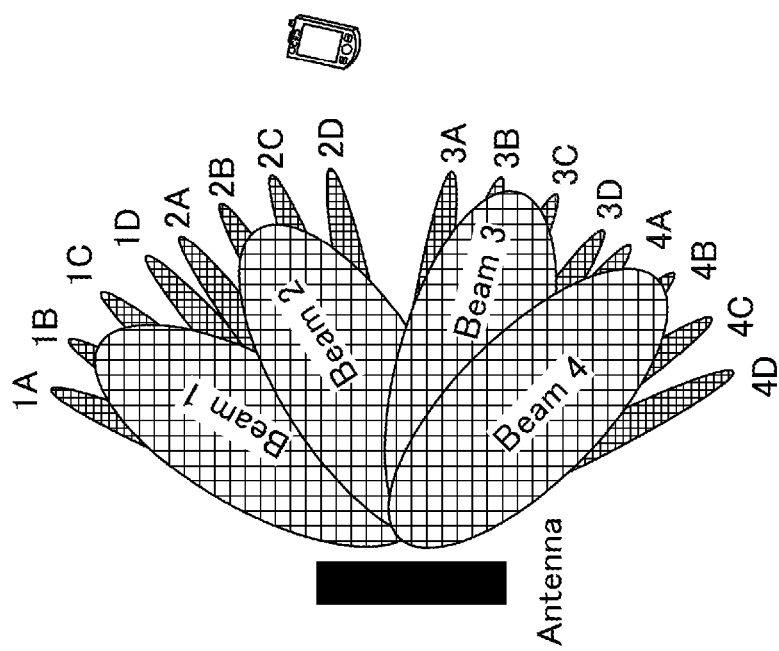

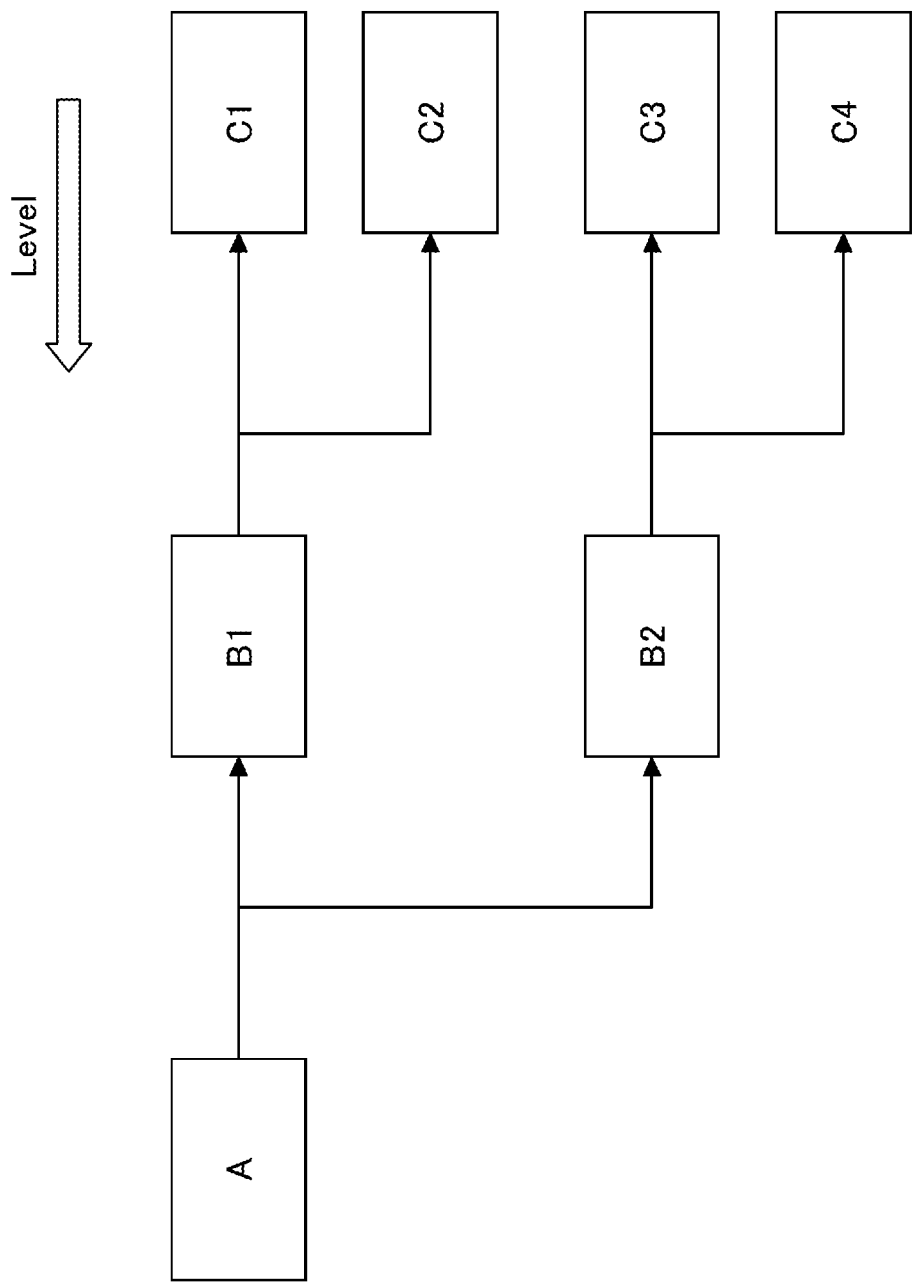

USER EQUIPMENT AND COMMUNICATION METHOD

TECHNICAL FIELD

The present invention relates to user equipment and a communication method in a radio communication system.

BACKGROUND ART

In New Radio (NR) (also referred to as 5G), which is a successor to Long-Term Evolution (LTE), a technology that meets requirements, including a large system capacity, a fast data transmission rate, low latency, concurrent connections of multiple terminals, a low cost, and reduced power consumption, has been discussed (Non-Patent Document 1, for example).

In NR, frequency bands higher than those of LTE are used. However, propagation loss increases in high frequency bands. In order to compensate for such propagation loss, a technology that increases received power by applying beamforming with a narrow beam width has been discussed (Non-Patent Document 2, for example).

RELATED-ART DOCUMENTS

Non-Patent Documents

[NON-PATENT DOCUMENT 1] 3GPP TS 38.300 V15.5.0 (2019-03)
[NON-PATENT DOCUMENT 2] 3GPP TS 38.211 V15.5.0 (2019-03)

SUMMARY OF THE INVENTION

Problem to be Solved by the Invention

In a radio communication system of NR, control signals associated with beams are transmitted from a base station apparatus to user equipment. For, example, if the number of beams transmitted from the base station apparatus is large, beam control loads on the user equipment may increase. Thus, it may take time for the user equipment to perform a synchronization process.

In view of the above, it is an object of the present invention to improve the efficiency of a synchronization process.

Means to Solve the Problem

According to the disclosed technology, user equipment includes a control unit configured to determine a spatial reception parameter of a channel, based on quasi co-location (QCL) information related to a synchronization signal or a reference signal; and a reception unit configured to receive the channel based on the determined spatial reception parameter. In the QCL information, a QCL parameter applied to a source signal is partially or entirely different from a QCL parameter applied to a destination signal.

Effects of the Invention

According to the disclosed technology, the efficiency of a synchronization process can be improved in a radio communication system.

BRIEF DESCRIPTION OF THE DRAWINGS

FIG. 5 is a diagram illustrating an example (1) for defining QCL according to an embodiment of the present invention;

FIG. 8 is a diagram illustrating an example (6) for defining QCL according to an embodiment of the present invention;

MODE FOR CARRYING OUT THE INVENTION

Figure 1:
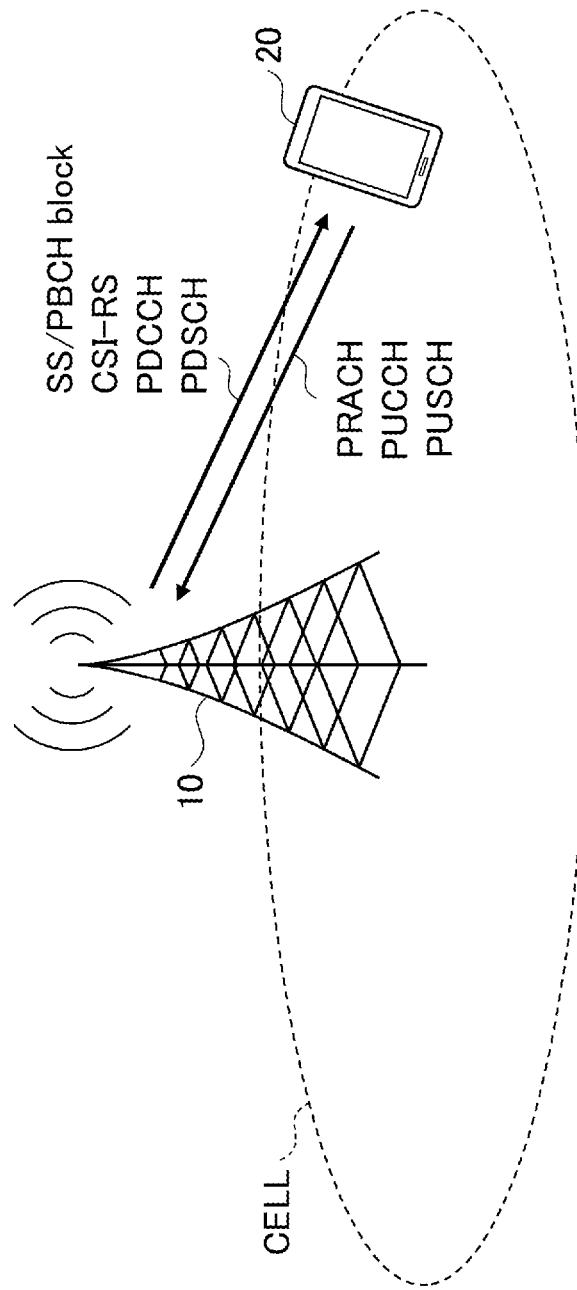
FIG. 1 is a diagram illustrating a radio communication system according to an embodiment of the present invention.

In the following, embodiments of the present invention will be described with reference to the drawings. The embodiments described below are merely examples, and embodiments to which the present invention is applied are not limited to the following embodiments.

An existing technology may be used as necessary when a radio communication system according to the embodiments of the present invention is operated. The existing technology may be LTE; however, the existing technology is not limited to LTE. As used herein, the term "LTE" has a broader meaning including LTE-Advanced and systems (such as NR) after LTE-Advanced, unless otherwise specified.

Further, in the embodiments of the present invention described below, terms used in the existing LTE, such as a synchronization signal (SS), a primary SS (PSS), a secondary SS (SSS), a physical broadcast channel (PBCH), a physical random access channel (PRACH), a physical uplink control channel (PUCCH), and a physical uplink shared channel (PUSCH), are used. The above-described terms are used for the convenience of description. Signals, functions, and the like, which are similar to the above-described terms, may be referred to as different names. In NR, the above-described terms are denoted as an NR-SS, an NR-PSS, an NR-SSS, an NR-PBCH, and an NR-PRACH. Note that a signal used in NR is not necessarily referred to as "NR-".

Further, in the embodiments, a duplex scheme may be a time division duplex (TDD) scheme, a frequency division duplex (FDD) scheme, or any other scheme (such as flexible duplex).

Further, in the following description, a method for transmitting a signal using a transmission beam may be digital beamforming in which a signal, to which a precoding vector is multiplexed (precoded with the precoding vector), is transmitted, or may be analog beamforming achieved by variable phase shifters in radio frequency (RF) circuits. Similarly, a method for receiving a signal using a reception beam may be digital beamforming in which a predetermined weight vector is multiplexed to the received signal, or may be analog beamforming achieved by variable phase shifters in radio frequency (RF) circuits. Alternatively, hybrid beamforming combining digital beamforming and analog beamforming may be applied. Further, transmitting a signal using a transmission beam may be transmitting a signal with a specific antenna port. Similarly, receiving a signal using a reception beam may be receiving a signal with a specific antenna port. The term "antenna port" refers to a logical antenna port or a physical antenna port defined by the 3GPP standards.

Note that methods of forming a transmission beam and a reception beam are not limited to the above-described methods. For example, in a base station apparatus 10 and user equipment 20, each including a plurality of antennas, a method of varying angles of the respective antennas may be used, a method in which a method of using a precoding vector and a method of varying angles of the antennas are combined may be used, a method of switching different multiple antenna panels may be used, or a method of switching different antenna panels may be used. The method of switching different antenna panels may be combined with other methods, or any other method may be used. Further, for example, in a high frequency band, a plurality of mutually different transmission beams may be used. An operation using a plurality of transmission beams is referred to as a multi-beam operation, and an operation using a single transmission beam is referred to as a single beam operation.

Further, in the embodiments of the present invention, the expression "a radio (wireless) parameter is configured" may mean that a predetermined value is pre-configured, or may mean that a radio parameter indicated by the base station apparatus 10 or the user equipment 20 is configured.

FIG. 1 is a diagram illustrating a radio communication system according to an embodiment of the present invention. As illustrated in FIG. 1, the radio communication system includes the base station apparatus 10 and the user equipment 20. The one base station apparatus 10 and the one user equipment 20 illustrated in FIG. 1 are merely examples, and a plurality of base station apparatuses 10 and a plurality of user equipment apparatuses 20 may be provided.

The base station apparatus 10 is a communication apparatus that provides one or more cells and wirelessly communicates with the user equipment 20. Physical resources of a radio signal may be defined in the time domain and the frequency domain, the time domain may be defined by the number of OFDM symbols, and the frequency domain may be defined by the number of subcarriers or the number of resource blocks. The base station apparatus 10 transmits a synchronization signal and system information to the user equipment 20. Examples of the synchronization signal include an NR-PSS and an NR-SSS. Part of the system information may be transmitted over an NR-PBCH, and may be referred to as broadcast information. A synchronization signal and broadcast information may be periodically transmitted as a SS block (SS/PBCH block) including a predetermined number of OFDM symbols. For example, the base station apparatus 10 transmits a control signal or data to the user equipment 20 in the downlink (DL), and receives a control signal or data from the user equipment 20 in the uplink. Both the base station apparatus 10 and the user equipment 20 can perform beamforming to transmit and receive signals. For example, as illustrated in FIG. 1, reference signals transmitted from the base station apparatus 10 include a channel state information reference signal (CSI-RS), and channels transmitted from the base station apparatus 10 include a physical downlink control channel (PDCCH) and a physical downlink shared channel (PDCCH).

The user equipment 20 is a communication apparatus equipped with a wireless communication function such as a smartphone, a tablet, a wearable device, or a communication module for M2M (machine-to-machine). The user equipment 20 utilizes various communication services provided by the radio communication system by receiving a control signal or data from the base station apparatus 10 in the DL, and transmitting a control signal or data to the base station apparatus 10 in the UL. For example, as illustrated in FIG. 1, channels transmitted from the user equipment 20 may be a physical uplink control channel (PUCCH) and a physical uplink shared channel (PUSCH).

In NR, an antenna port is defined such that the channel over which a symbol on the antenna port is conveyed can be inferred from the channel over which another symbol on the same antenna port is conveyed. Two antenna ports are said to be quasi co-located (QCL) if channel propagation properties of the channel over which a symbol on one antenna port is conveyed can be inferred from the channel over which a symbol on the other antenna port is conveyed. The channel propagation properties include delay spread, Doppler spread, Doppler shift, average gain, average delay, and spatial reception parameters.

A plurality of QCL types are defined. QCL-Type A is related to Doppler shift, Doppler spread, average delay, and delay speed. QCL-Type B is related to Doppler shift and Doppler spread. QCL-Type C is related to Doppler shift and average delay. QCL-Type D is related to a spatial reception parameter (Spatial Rx parameter). Therefore, QCL-Type A, QCL-Type B, and QCL-Type C are QCL information related to a time or frequency synchronization process. QCL-Type D is QCL information related to beam control. As used herein, "synchronization" may include QCL-Types A to D. Further, as used herein, "synchronization" may include signal processing based on QCL-Types A to D.

For example, if QCL-Type D is configured for a SS block and a CSI-RS, the user equipment 20 assumes that the SS block and the CSI-RS are transmitted from the base station apparatus 10 by using the same DL beam, and applies the same reception beamforming to receive the SS block and the CSI-RS. In the following description, "QCL-Type D" is mainly described; however, "QCL-Type D" may be appropriately replaced with QCL-Type A, QCL-Type B, or QCL-Type C.

Figure 2:
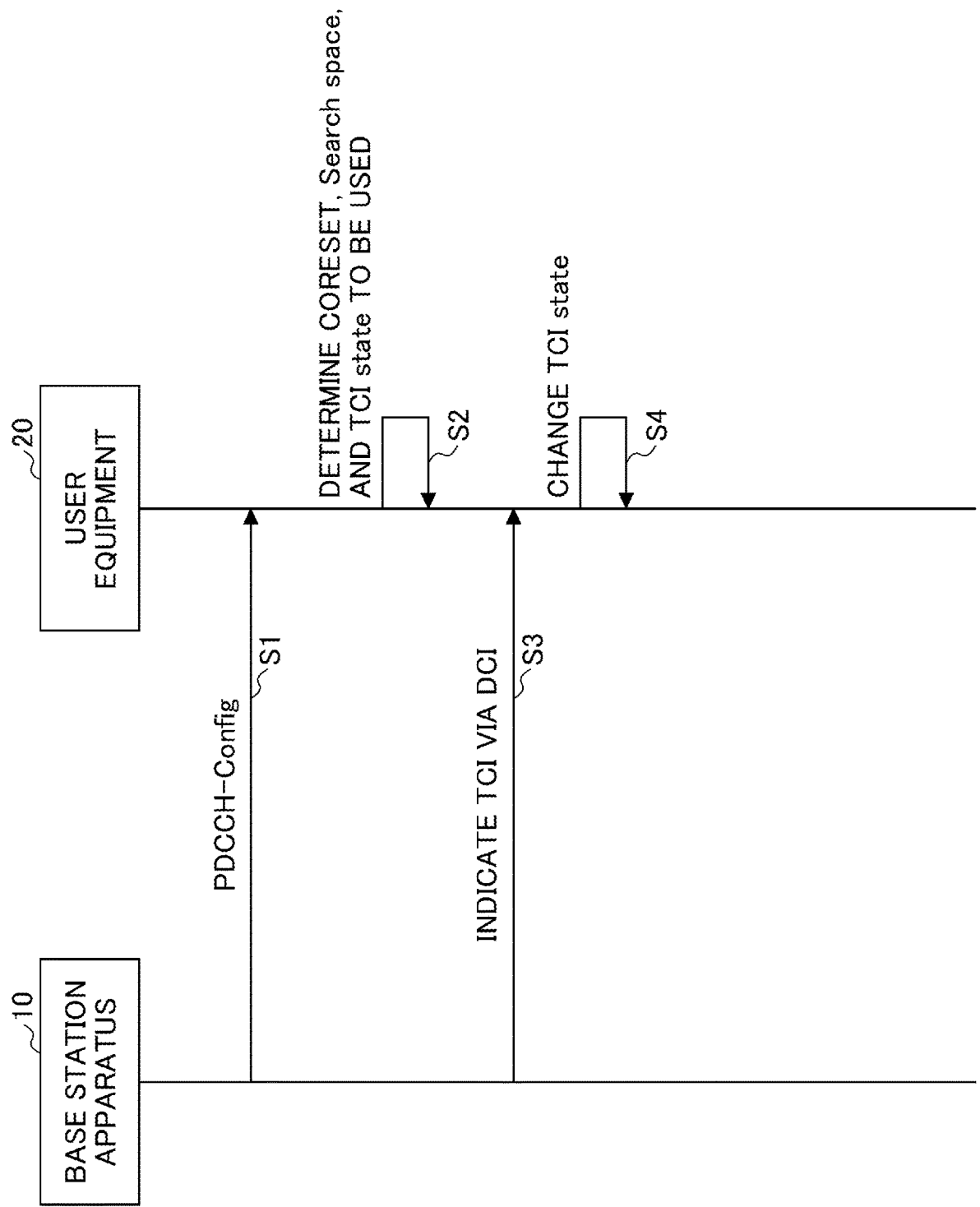
FIG. 2 is a sequence diagram illustrating an example of configuring a TCI state.

FIG. 2 is a sequence diagram illustrating an example of configuring a TCI state according to an embodiment of the present invention. In NR, a transmission configuration indicator (TCI) state is defined. A TCI state indicates a QCL relationship between DL reference signals. One or more TCI states are included in radio resource control (RRC) signaling, which configures a control resource set (CORESET). The DL reference signals are SS blocks or CSI-RSs. That is, a TCI state is applied based on a control resource set, and a DL reference signal associated with the TCI state is determined.

In step S1, the base station apparatus 10 transmits PDCCH-Config to the user equipment 20 via RRC signaling. The PDCCH-Config includes information that allows the user equipment 20 to receive a PDCCH. The PDCCH-Config may be indicated to the user equipment 20 as broadcast information, or may be indicated to the user equipment 20 via another RRC signaling. The PDCCH-Config includes information that defines a control resource set and information that defines a search space.

In step S2, the user equipment 20 determines a control resource set, a search space, and a TCI state to be used, based on the PDCCH-Config received in step S1. The user equipment 20 monitors control information in the determined search space.

In step S3, if the PDCCH-Config includes information indicating that TCI state(s) are to be indicated via DCI, the base station apparatus 10 dynamically indicates a TCI state via the DCI, which is physical (PHY) layer signaling, to the user equipment 20. Next, the user equipment 20 changes the TCI state to the indicated TCI state (step S4). Note that step S3 and step S4 may be performed, but are not necessarily performed. For example, after step S4, the base station apparatus 10 and the user equipment 20 perform a random access procedure. The user equipment 20 assumes QCL based on a SS block or a CSI-RS that has been selected for transmission of a PRACH, and monitors control information.

Figure 3:
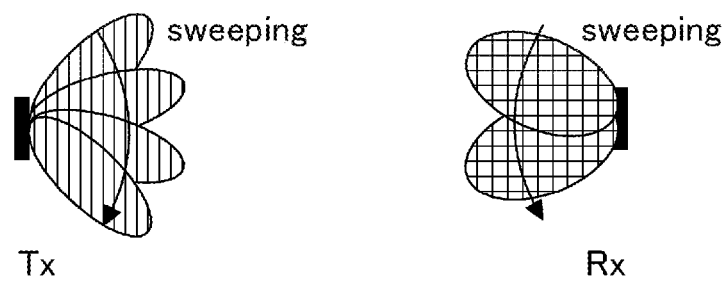
FIG. 3 is a diagram illustrating an example of beam management.

FIG. 3 is a diagram illustrating an example of beam management. In NR, beam management as illustrated in FIG. 3 is employed. In beam management, at least one of the base station apparatus 10 and the user equipment 20 forms beams to improve transmission quality. In the example of beam management illustrated in FIG. 3, a system capable of configuring four beams for Tx and two beams for Rx is depicted. In this system, as illustrated in FIG. 3, beam sweeping is performed in both transmission and reception directions, and an appropriate beam pair is selected from a total of eight transmission and reception beam pairs. Note that beam control may be performed at multiple levels, including wide (rough) beams and narrow (fine) beams.

Figure 4:
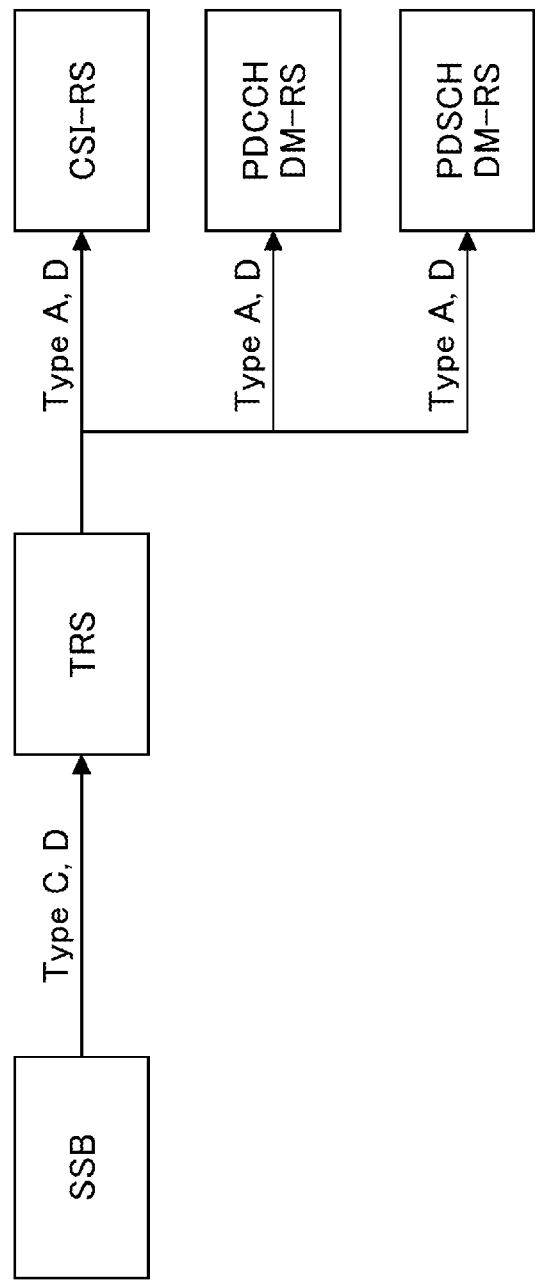
FIG. 4 is a diagram illustrating an example of QCL.

FIG. 4 is a diagram illustrating an example of QCL. As described above, QCL is defined between two signals. If wireless parameters of the two signals are assumed to be the same, the two signals are defined to be quasi co-located. In FIG. 4, an example of a QCL relationship (association) is depicted. The QCL relationship includes a parent-child relationship, that is a source-destination relationship. For example, as illustrated in FIG. 4, for QCL-Type C and QCL-Type D, an SSB is a source, and a TRS (tracking reference signal or CSI-RS for tracking) is a destination. For QCL type A and QCL type D, the TRS is a source, and a CSI-RS, a PDCCH demodulation reference signal (PDCCH DM-RS) and a PDSCH DM-RS are destinations. However, the concept of the source-destination relationship is not necessarily consistent with the description in the standard specification, and may simply be defined as prerequisite information on synchronization utilized by nodes in signal transmission and reception. For example, the source-destination relationship may be defined as information indicating an association between reference signals, in which a QCL parameter applied to one of the reference signals may be associated with a QCL parameter applied to the other reference signal.

In the existing techniques, information of a source signal with QCL is indicated to a given signal. For example, the base station apparatus 10 indicates an SSB source with QCL-Type C and QCL-Type D to a destination TRS. Note that information related to QCL may be signaled through TCI states as described in FIG. 2.

For example, when the base station apparatus 10 switches transmission beams, QCL information needs to be switched. For example, if QCL information is switched, a delay in measurement would increase. Further, if QCL information is switched, the user equipment 20 would need to perform time and frequency synchronization again, and search transmission and reception beam pairs again.

In light of the above, the embodiments of the present invention propose a method for efficiently indicating or switching QCL information. For example, according to the embodiments of the present invention, it is possible to reduce the processing time and the number of times of processing required for synchronization of the user equipment 20, and the processing time and the number of times of processing required for beam control. Further, according to the embodiments of the present invention, QCL definitions are not limited by the existing QCL definitions. For example, a new QCL type may be defined and used.

Further, in NR radio resource management (RRM), the concept of "known cell" is employed. For example, if the user equipment 20 has completed at least one of synchronization and beam control with respect to a given reference signal, the given reference signal may be assumed to be known, or a cell of the reference signal may be assumed to be known. Most technologies used in synchronization and beam control by the user equipment 20 are implementation technologies, and whether or not a reference signal is known may be defined by the number of delayed or received samples after the reference signal is received. Cells other than known cells may be referred to as unknown cells. In addition, instead of the two levels of states, a larger number of states may be defined, depending on the size of advance information related to a cell.

The concept of "known cell" can be applied not only to RRM, but also to physical layer control. For example, if a cell is known, there may be no scheduling restrictions or scheduling restrictions may be partially performed. Further, if a cell is unknown, the user equipment 20 may perform a reception process based on the last QCL information within a predetermined interval such as an interval required for switching QCL information; however, the reception process is not required to be performed. Further, known cell and unknown cell states may be states defined by signal processing by a node, or may be defined by restriction conditions (such as delay time) associated with signal processing by a node.

FIG. 5 is a diagram illustrating an example (1) for defining QCL according to an embodiment of the present invention. In Example 1 illustrated in FIG. 5, QCL may be applied to a beam configuration in which the same beams are applied to different signals. In Example 1, beams 1 to 4 are applied to SSBs and TRSs. In the case of QCL-Type C and QCL-Type D, if a source is an SSB, a destination is a TR, and the beam 2 is applied to the SSB, the user equipment 20 assumes that the beam 2 is applied to the TRS. However, in order for the user equipment 20 to perform a reception process, a source signal and a designation signal are not required to be completely the same in terms of a QCL parameter. That is, a QCL parameter applied to the source signal may partially or entirely differ from a QCL parameter applied to the destination signal.

As illustrated in Example 2 of FIG. 5, as control of different beams, QCL may be applied to a beam configuration in which beams having different widths are applied to different signals. In Example 2, wide beams 1 to 4 are applied to SSBs, and narrow beams 1A to 4D are applied to TRSs. For example, a QCL relationship may be defined between signals to which beams that are in an inclusion relationship or beams that are partially overlapping are applied. For example, the width of a beam as described above can be expressed as the full width at half maximum of the spatial signal gain or power.

As used herein, one beam wider than another beam means that a range of the one beam in which received power greater than or equal to a predetermined value is detected is wider than a range of the other beam in which received power greater than or equal to the predetermined value is detected, in a case where the beams are transmitted with the same transmission power at a predetermined distance. Further, the inclusion relationship between one beam and another beam is defined based on whether a range of the one beam in which received power greater than or equal to the predetermined value is detected overlaps with a range of the other beam in which received power greater than or equal to the predetermined value is detected. For example, in FIG. 5, the beam 1A, the beam 1B, the beam 1C, and the beam 1D may be defined as being included in the beam 1. The beam 2A, the beam 2B, the beam 2C, and the beam 2D may be defined as being included in the beam 2. The beam 3A, the beam 3B, the beam 3C, and the beam 3D may be defined as being included in the beam 3. The beam 4A, the beam 4B, the beam 4C, and the beam 4D may be defined as being included in the beam 4.

For example, the base station apparatus 10 may indicate that the beam 2D is quasi co-located with the beam 2, to the user equipment 20. Further, the base station apparatus 10 may indicate that the beam 2 is quasi co-located with the beam 2A, the beam 2B, the beam 2C, and the beam 2D, to the user equipment 20. Further, the base station apparatus 10 may indicate that the beam 2 is quasi co-located with the beam 2D, to the user equipment 20. Further, the base station apparatus 10 may indicate that the beam 2 is quasi co-located with the beam 2A, the beam 2B, the beam 2C, and the beam 2D, to the user equipment 20. A QCL relationship between different signals to which beams having different widths are applied may be defined as being distinguished from a QCL relationship between different signals to which the same beams are applied, which may be indicated to the user equipment 20.

Further, for example, a QCL relationship may be defined between signals to which adjacent beams are applied. The "adjacent beams" refer to beams whose directions are close to each other, from a plurality of beams that are alike except for the directions. For example, the beam 2 illustrated in in FIG. 5 is the closest to the beam 1 and the beam 3. Further, for example, the beam 2D illustrated in FIG. 5 is the closest to the beam 2C and the beam 3A. As used herein, the term "close" may be expressed as an angle difference between the main direction of radiation/arrival.

For example, the base station apparatus 10 may indicate that the beam 2D is quasi co-located with the beam 2C, to the user equipment 20. Further, for example, the base station apparatus 10 may indicate that the beam 2D is quasi co-located with the beam 2B, the beam 2C, the beam 3A, and the beam 3B, to the user equipment 20. A QCL relationship between different signals to which beams close to each other are applied may be defined as being distinguished from a QCL relationship between different signals to which the same beams are applied, which may be indicated to the user equipment 20.

Although QCL-Type D with respect to beams has been described above, the inclusion relationship or the partially overlapping relationship between beams applied to signals may be applied to other QCL types.

Figure 6A:
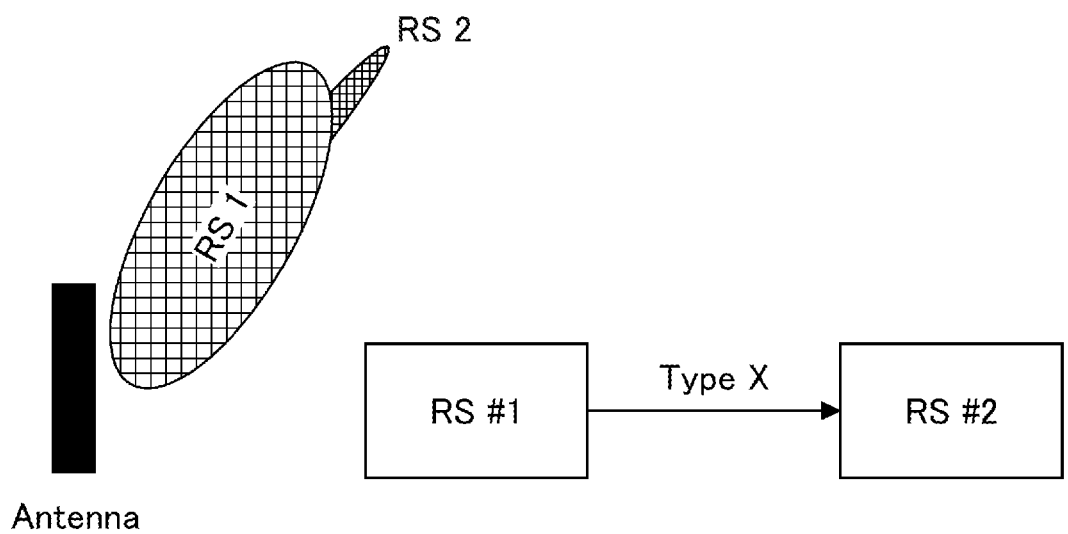
FIG. 6A 6A is a diagram illustrating an example (2) of defining QCL according to an embodiment of the present invention.

FIG. 6A is a diagram illustrating an example (2) of defining QCL according to an embodiment of the present invention. New QCL-Type X is defined, and an inclusion relationship or an overlapping relationship between analog beams (spatial domain Tx/Rx filters) may be defined or indicated. For example, as illustrated in FIG. 6A, when an analog beam applied to an RS2 is included in an analog beam applied to an RS1, QCL-Type X in which the RS1 is a source and the RS2 is a destination, may be defined.

Figure 6B:
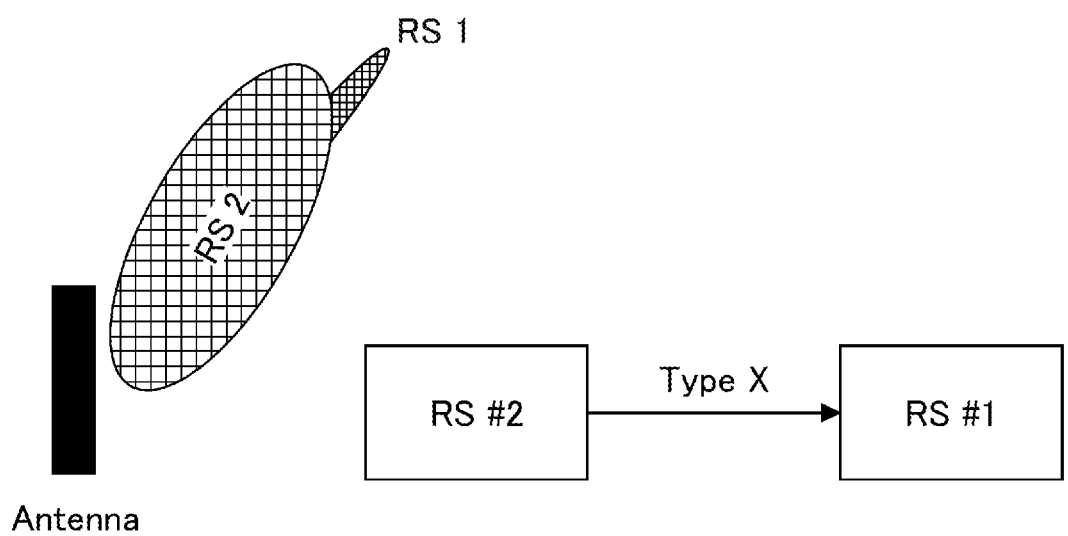
FIG. 6B is a diagram illustrating an example (3) of defining QCL according to an embodiment of the present invention.

FIG. 6B is a diagram illustrating an example (3) of defining QCL according to an embodiment of the present invention. For example, as illustrated in FIG. 6B, if an analog beam applied to an RS1 is included in an analog beam applied to an RS2, QCL-Type X in which the RS2 is a source and the RS1 is a destination may be defined.

As illustrated in FIG. 6A and FIG. 6B, by indicating QCL-Type X, which is different from QCL-Type D, it is possible to separately indicate that analog beams are the same or one analog beam is included in another analog beam. When the user equipment 20 determines a reception analog beam (spatial domain Rx filter), the user equipment 20 assumes that a reception analog beam for receiving an RS1 and a reception analog beam for receiving an RS2 are equivalent. Therefore, in the example of FIG. 6A, the beam applied to the RS1 includes the beam applied to the RS2, and thus, the number of elements of the beam applied to the RS1 is smaller than the number of elements of the beam applied to the RS2. Therefore, by indicating QCL-Type X, it is possible to reduce the number of search times of a reception analog beam for receiving the RS2.

Further, a plurality of sources may be configured in QCL. For example, a plurality of sources may be configured with the same QCL type or QCL-related parameter. For example, in FIG. 5, signals to which the beam 2 and the beam 3 are applied may be used as source signals, for a signal to which the beam 2D is applied. For example, if a plurality of sources are configured in QCL, the user equipment 20 may use a part of or the entirely of the plurality of sources to perform synchronization or beam control, or may use any one of the plurality of sources to perform synchronization or beam control. For example, if QCL is switched between a plurality of configured sources, the user equipment 20 may assume that signals newly configured as a result of switching are known signals.

Further, a destination may be indicated in QCL. For example, a plurality of destinations may be indicated to a single source with a certain QCL type or QCL-related parameter. While a source signal with respect to a given signal is indicated in the related-art QCL, a destination signal with respect to a given signal may be indicated in QCL according to an embodiment of the present invention.

Figure 7A:
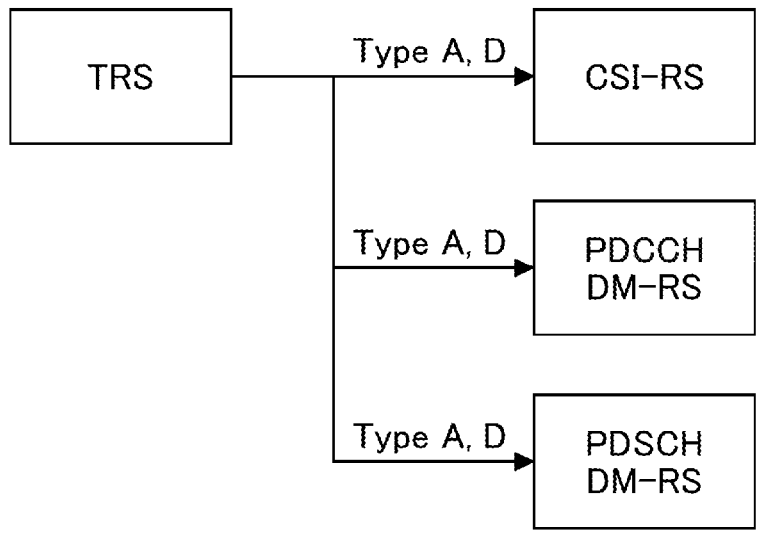
FIG. 7A is a diagram illustrating an example (4) for defining QCL according to an embodiment of the present invention.

FIG. 7A is a diagram illustrating an example (4) for defining QCL according to an embodiment of the present invention. As illustrated in FIG. 7A, a source signal with respect to given signals may be indicated. With respect to a CSI-RS, a source signal TRS with QCL-Type A and QCL-Type D may be indicated. Further, with respect to a PDCCH DM-RS, the source signal TRS with QCL-Type A and QCL-Type D may be indicated. Further, with respect to a PDSCH DM-RS, the source signal TRS with QCL-Type A and QCL-Type D may be indicated.

Figure 7B:
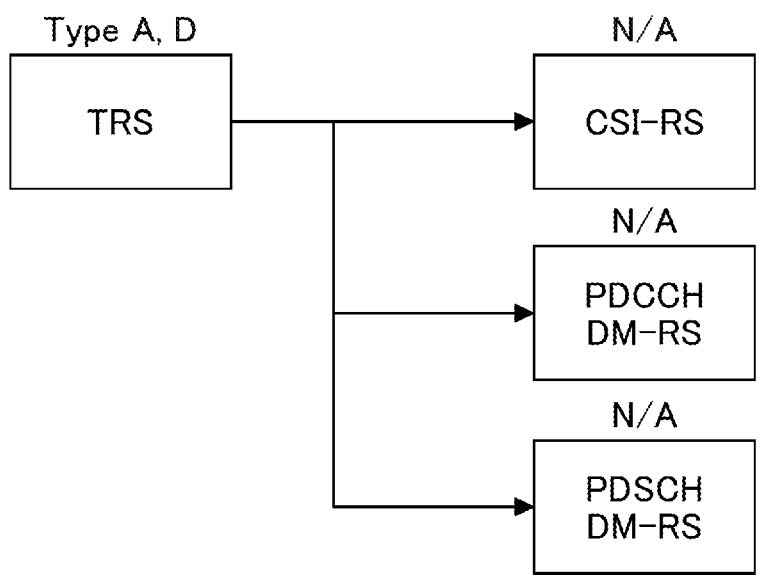
FIG. 7B is a diagram illustrating an example (5) for defining QCL according to an embodiment of the present invention.

FIG. 7B is a diagram illustrating an example (5) for defining QCL according to an embodiment of the present invention. In QCL, as an example method for configuring one or more sources and one or more destinations, a QCL type or QCL-related parameter available to a given signal may be indicated. For example, a QCL type or QCL-related parameter available to a given signal may be set to "N/A". For example, there may be limitations on QCL types or QCL-related parameters available to each signal type. For example, as illustrated in FIG. 7B, QCL types available to the TRS may be type A and type D, and QCL types available to the CSI-RS, the PDCCH DM-RS, and the PDSCH DM-RS may be set to "N/A". For example, QCL types or QCL-related parameters available to a given signal as described above may be included in a reference signal configuration (for example, NZP-CSI-RS-Resource) and indicated from the base station apparatus 10 to the user equipment 20.

Further, for example, a signal may be associated with another signal. In the example illustrated in FIG. 7B, the TRS is associated with the CSI-RS, the TRS is associated with the PDCCH DM-RS, and the TRS is associated with the PDSCH DM-RS. Further, three or more signals may be associated and defined as a QCL group. For example, each signal included in a QCL group may be defined as a source signal with QCL types or QCL-related parameters indicated as available to each of the signals.

When QCL is switched, it may be possible to specify whether information learned from the previous QCL before switching can be reused. For example, if a QCL source is switched, information, indicating whether QCL information learned from the previous QCL source before switching can be reused, may be signaled from the base station apparatus 10 to the user equipment 20. For example, if a QCL destination is switched, information, indicating whether QCL information learned from the previous QCL destination before switching can be reused, may be signaled from the base station apparatus 10 to the user equipment 20. For example, information indicating whether QCL information can be reused may be included in switched new QCL information, and may be signaled from the base station apparatus 10 to the user equipment 20. Further, the timing at which to signal information indicating whether QCL information can be reused is not limited to the timing of QCL switching. Information indicating whether QCL information can be reused may be signaled from the base station apparatus 10 to the user equipment 20 as necessary.

Further, for example, the level of synchronization or beam control required to maintain a connection is considered to be different from the level of synchronization or beam control required to achieve high throughput. Further, when there are a plurality of QCL sources, communication efficiency is considered to be improved by setting priorities for applying the QCL sources. Accordingly, a plurality of QCL accuracy levels may be set. For example, QCL accuracy levels may be indicated from the base station apparatus 10 to the user equipment 20 as QCL information. Further, among a plurality of indicated QCL sources, information of which QCL source is given priority and is to be applied may be indicated from the base station apparatus 10 to the user equipment 20 as QCL information. Further, the above-described accuracy levels or priorities may be determined in accordance with beam widths. Namely, the above-described accuracy levels or priorities may be determined based on whether beams are rough beams or fine beams. Further, the above-described accuracy levels or priorities may be defined as a new QCL type or a QCL-related parameter.

Further, as in a case where semi-persistent transmission and aperiodic transmission are switched, a transmission parameter of a signal may be changed. If the transmission parameter is changed, whether or not the QCL relationship is maintained is unknown. For example, if a semi-persistent CSI-RS is deactivated, there may be a possibility that the CSI-RS would not be maintained as a QCL source.

In light of the above, conditions under which a reference signal can be a QCL source may be specified or indicated. For example, for semi-persistently transmitted reference signals, whether or not QCL is applied to the reference signals may be determined based on whether the reference signals are activated or deactivated. For example, QCL may be applied to active reference signal resources only. Further, if a QCL source is not applicable, a signal that is a destination for the QCL source is not required to be received. For example, QCL may be applied to reference signals each having a transmission density greater than or equal to a predetermined level. For example, the transmission density may be defined by at least one of the number of resources in the time domain and the number of resources in the frequency domain, or may be defined by the number of resource elements. Further, if the number of samples of a reference signal included in a predetermined past time interval is greater than or equal to a predetermined value, the reference signal may be defined as a QCL source.

FIG. 8 is a diagram illustrating an example (6) for defining QCL according to an embodiment of the present invention. The number of levels to which QCL relationships can be traced back may be defined. For example, information indicating whether a QCL relationship between one signal and another signal can be traced may be indicated, or the number of levels to which QCL relationships can be traced back may be indicated. For example, information indicating whether C1 illustrated in FIG. 8 can assume A as a QCL source may be indicated, or information indicating that C1 can trace QCL relationships back to two levels may be indicated.

C1 and C2 illustrated in FIG. 8 are grandchildren of A, and A is a grandparent of C1 and C2. B1 is a parent of C1 and C2, and C1 and C2 are children of B1. C2 is a sibling of C1. B2 is an uncle/aunt of C1; C1 and C2 are nephews/nieces of B2. As described above, degrees of relationship can be defined.

For example, C1 and C2 are in the second degree, C1 and A are in the second degree, and C1 and B1 are in the first degree. Whether or not one signal can assume another signal as a QCL source may be specified or indicated in accordance with the degree of relationship. If signals are in an uncle-aunt relationship or in a nephew-niece relationship, whether or not one of the signals may assume the other signal as a QCL source may be defined or indicated.

For example, in the above-described QCL relationships, whether or not signals can be QCL sources may be changed on a per-QCL-type basis. Further, if both signals are SSBs, whether or not a QCL relationship can be assumed may be defined or indicated.

According to the above-described embodiments, the user equipment 20 can perform a synchronization process or beam control by assuming an appropriate QCL based on QCL information indicated from the base station apparatus 10. That is, the efficiency of a synchronization process can be improved in the radio communication system.

Note that the application of the above-described embodiments is not limited to transmission and reception of uplink or downlink communications. The above-described embodiments may be applied to any transmission and reception communications. That is, uplink signals and channels may be interchangeably read as downlink signals and channels, and uplink feedback information may be interchangeably read as downlink control signaling. Further, the embodiments of the present invention have been described mainly based on the assumption that NR channels and signaling methods are used; however, the embodiments of the present invention may be applied to channels and signaling methods having functions similar to those of NR. For example, the embodiments of the present invention may be applied to LTE, LTE-A or other RATS. In the embodiments of the present invention, a TRS represents a tracking reference signal; however, a TRS may represent a CSI-RS for tracking in NR, for example.

Further, the above-described signaling is not limited to an explicit method. The above-described signaling may be implicitly performed, or may be uniquely determined by design. Further, the above-described signaling may be performed via RRC, MAC CE, DCI, or any other layer, or may use MIB, SIB, or the like. Further, RRC and DCI may be combined, RRC and MAC CE may be combined, or all of them may be combined.

Further, in the above-described embodiments, the term "beam" or "beamforming (BF) RS" is used; however, whether or not a physical signal or a channel is subjected to beamforming may be transparent to the base station apparatus or the user equipment. The "beam" or "BF RS" may be replaced with a signal or a RS. Further, a RS subjected to beamforming may be referred to as a resource or a RS resource. Further, beams may be formed on a per-antenna-port basis. Similarly, "beam selection" may be replaced with "resource selection" or the like, or a "beam index" may be replaced with a "resource index" or an "antenna port index".

The above-described embodiments and modifications may be combined, and the above-described may be combined in various combinations. The embodiments of the present invention are not limited to any particular combination of the disclosed embodiments and modifications.

(Device Configuration)

Next, examples of functional configurations of the base station apparatus 10 and the user equipment 20 that perform the processes and operations according to the above-described embodiments will be described. The base station apparatus 10 and the user equipment 20 include the functions described in the above embodiments. However, the base station apparatus 10 and the user equipment 20 may each include some of the functions described in the embodiments.

<Base Station Apparatus 10>

Figure 9:
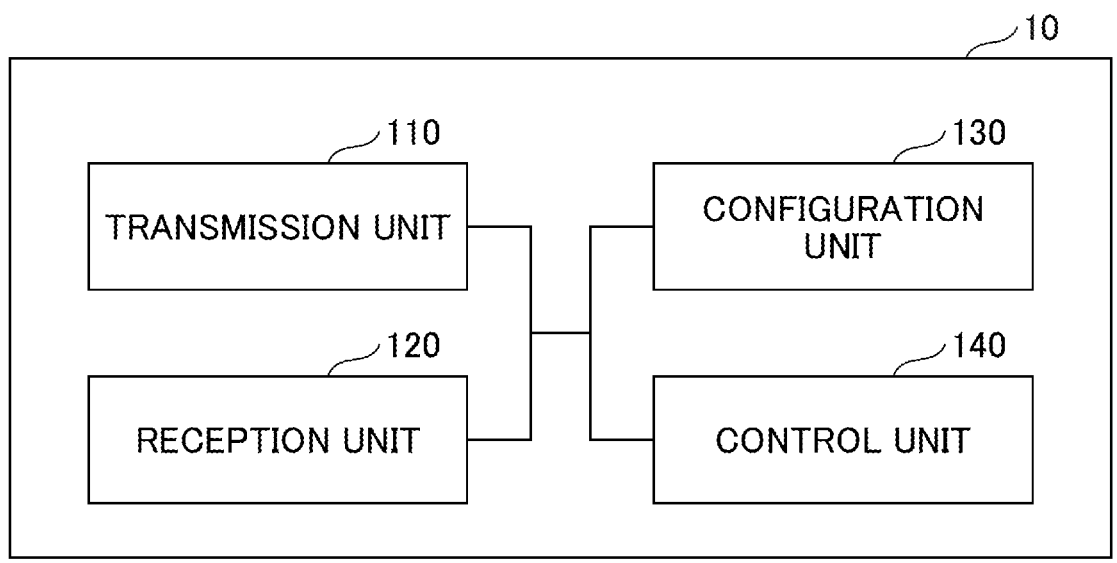
FIG. 9 is a diagram illustrating an example of a functional configuration of a base station apparatus 10 according to an embodiment of the present invention.

FIG. 9 is a diagram illustrating an example of a functional configuration of the base station apparatus 10. As illustrated in FIG. 9, the base station apparatus 10 includes a configuration unit 110, a reception unit 120, a configuration unit 130, and a control unit 140. The functional configuration illustrated in FIG. 9 is merely an example. As long as the operations according to the embodiments of the present invention can be performed, any functional classifications and names of functional units may be used.

The configuration unit 110 includes a function to generate a signal and to wirelessly transmit the signal to the user equipment 20. The reception unit 120 includes a function to receive various types of signals transmitted from the user equipment 20 and to obtain higher layer information from the received signals. In addition, the configuration unit 110 includes a function to transmit NR-PSS, NR-SSS, NR-PBCH, DL/UL control signal, and the like, to the user equipment 20.

The configuration unit 130 stores, in a storage device, preconfigured setting information and various types of setting information to be transmitted to the user equipment 20, and reads such setting information from the storage device as necessary. Contents of the setting information may be control information of the user equipment 20 and information related to QCL, for example.

The control unit 140 performs a process for generating control information to be transmitted to the user equipment 20, as described in the above embodiments. Further, the control unit 140 performs communication control for applying transmission beamforming, based on information related to QCL. A functional unit of the control unit 140 for signal transmission may be included in the configuration unit 110, and a functional unit of the control unit 140 for signal reception may be included in the reception unit 120.

<User Equipment 20>

Figure 10:
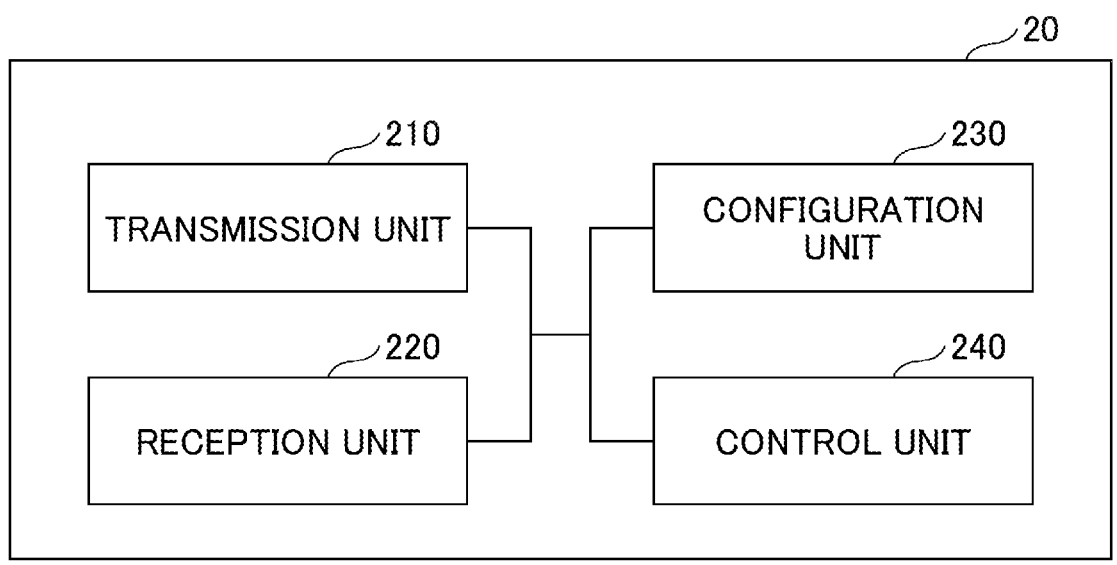
FIG. 10 is a diagram illustrating an example of a functional configuration of user equipment 20 according to an embodiment of the present invention.

FIG. 10 is a diagram illustrating an example of a functional configuration of the user equipment 20. As illustrated in FIG. 10, the user equipment 20 includes a configuration unit 210, a reception unit 220, a configuration unit 230, and a control unit 240. The functional configuration illustrated in FIG. 10 is merely an example. As long as the operations according to the embodiments of the present invention can be performed, any functional classifications and names of functional units may be used.

The configuration unit 210 generates a transmission signal from transmission data, and wirelessly transmits the transmission signal. The reception unit 220 wirelessly receives various types of signals, and obtains higher layer signals from the received physical layer signals. In addition, the reception unit 220 may include a function to receive an NR-PSS, an NR-SSS, an NR-PBCH, a DL/UL/SL control signal, and the like transmitted from the base station apparatus 10. Further, as D2D communication, the configuration unit 210 transmits a physical sidelink control channel (PSCCH), a physical sidelink shared channel (PSSCH), a physical sidelink discovery channel (PSDCH), a physical sidelink broadcast channel (PSBCH), and the like to another user equipment apparatus 20, and receives a PSCCH, a PSSCH, a PSDCH, a PSBCH, and the like from the other user equipment 20.

The configuration unit 230 stores, in a storage device, various types of setting information received from the base station apparatus 10 or another user equipment apparatus 20 via the reception unit 220, and reads such setting information from the storage device as necessary. In addition, the configuration unit 230 stores preconfigured setting information. Contents of the setting information may be control information of the user equipment 20 and information related to QCL, for example.

The control unit 240 applies reception beamforming and performs synchronization, based on control information and QCL information acquired from the base station apparatus 10 as described in the above embodiments. Further, the control unit 240 may control a random access procedure performed with the base station apparatus 10. A functional unit of the control unit 240 for signal transmission may be included in the configuration unit 210, and a functional unit of the control unit 240 for signal reception may be included in the reception unit 220.

(Hardware Configuration)

The block diagrams (FIG. 9 and FIG. 10) used in the above description of the embodiments illustrate functional unit blocks. These functional blocks (components) are implemented in any combination of hardware and/or software. Further, means for implementing the functional blocks are not particularly limited. In other words, the functional blocks may be implemented in one physically and/or logically coupled device or in multiple devices where two or more physically and/or logically separated devices are connected directly and/or indirectly (for example, in wired and/or wireless manners). A functional block may be implemented by combining software with the above-described one or more devices.

The functions include judging, deciding, determining, computing, calculating, processing, deriving, examining, searching, ascertaining, receiving, transmitting, outputting, accessing, solving, selecting, choosing, establishing, comparing, assuming, expecting, deeming, broadcasting, notifying, communicating, forwarding, configuring, reconfiguring, allocating, mapping, and assigning; however, the functions are not limited thereto. For example, a functional block (component) for transmission is referred to as a transmitting unit or a configuration unit. For all the functions, the implementation methods are not particularly limited as described above.

Figure 11:
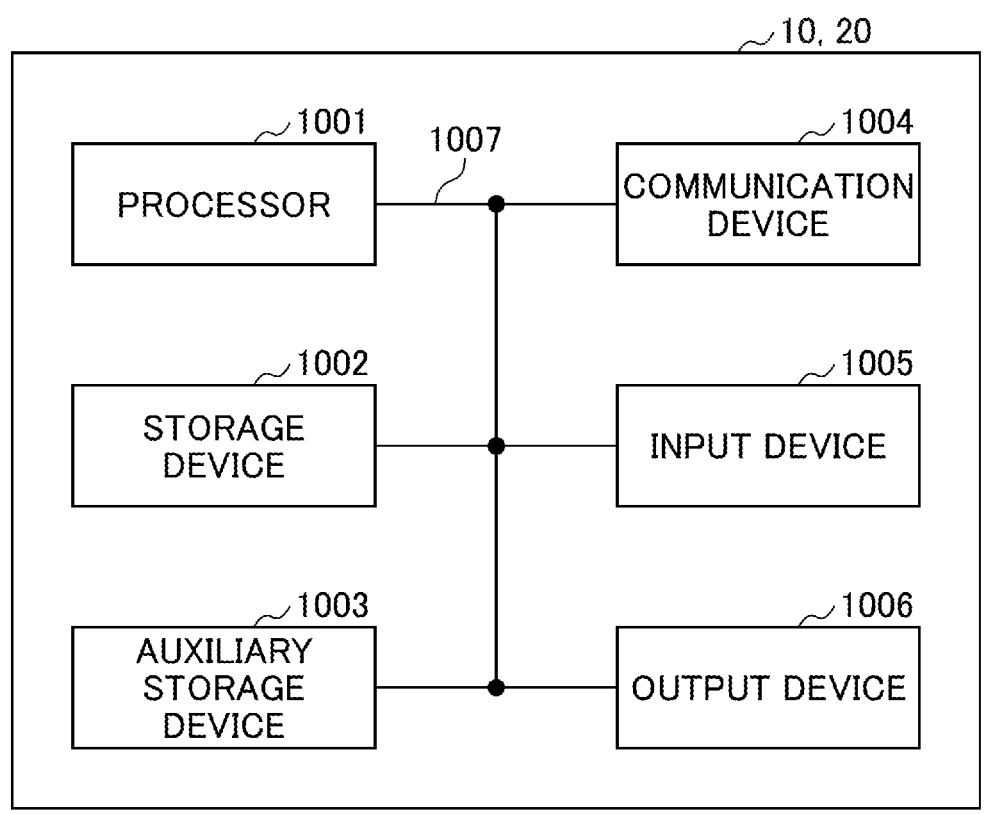
FIG. 11 is a diagram illustrating a hardware configuration of the base station apparatus 10 or the user equipment 20.

For example, the base station apparatus 10 and the user equipment 20 according to an embodiment of the present disclosure may function as computers for executing a process of a radio communication method according to the present disclosure. FIG. 11 is a diagram illustrating a hardware configuration of each of the base station apparatus 10 and the user equipment 20 according to an embodiment of the present disclosure. Each of the above-described base station apparatus 10 and the user equipment 20 may be physically configured as a computer including a processor 1001, a storage device 1002, an auxiliary storage device 1003, a communication device 1004, an input device 1005, an output device 1006, and a bus 1007.

In the following description, the term "apparatus" can be interchangeably read as a circuit, a device, a unit or the like. The hardware configuration of each of the base station apparatus 10 and the user equipment 20 may be configured so as to include the one or more devices illustrated in FIG. 11 or so as not to include a part of the devices.

The functions of the base station apparatus 10 and the user equipment 20 are implemented by causing hardware such as the processor 1001 and the storage device 1002 to read predetermined software (a program) so as to allow the processor 1001 to execute operations, control communication by the communication device 1004, and control at least one of reading and writing of data from/into the storage device 1002 and the auxiliary storage device 1003.

The processor 1001 controls the whole computer by, for example, running an operating system. The processor 1001 may be configured by a central processing unit (CPU) including an interface with a peripheral device, a control device, an arithmetic device, and a register. For example, each of the above-described control unit 140, the control unit 240, and the like may be implemented by the processor 1001.

Further, the processor 1001 reads programs (program codes), software modules, and data from at least one of the auxiliary storage device 1003 and the communication device 1004 into the storage device 1002, and executes various processes in accordance therewith. Examples of the programs include a program for causing the computer to execute at least a part of operations described in the above embodiments. For example, the control unit 140 of the base station apparatus 10 illustrated in FIG. 9 may be stored in the storage device 1002, and may be implemented by control programs executed by the processor 1001. In addition, for example, the control unit 240 of the user equipment 20 illustrated in FIG. 10 may be stored in the storage device 1002, and may be implemented by control programs executed by the processor 1001. Although an example in which the above-described various types of processes are performed by the single processor 1001 has been described, the processes may be simultaneously or sequentially performed by two or more processors 1001. The processor 1001 may be implemented with one or more chips. Note that the programs may be transmitted from a network via an electric communication line.

The storage device 1002 is a computer-readable recording medium, and may include at least one of a read-only memory (ROM), an erasable programmable ROM (EPROM), an electrically erasable programmable ROM (EEPROM), and a random-access memory (RAM), for example. The storage device 1002 may be referred to as a register, a cache, or a main memory (a main storage device). The storage device 1002 can store, for example, programs (program codes) and software modules that can be executed to perform the communication method according to an embodiment of the present disclosure.

The auxiliary storage device 1003 is a computer-readable recording medium, and may include at least one of an optical disc such as a compact disc read-only memory (CD-ROM), a hard disk drive, a flexible disk, a magnetic optical disc (such as a compact disc, a digital versatile disc, and a Blu-ray (registered trademark) disk), a smart card, flash memory (such as a card, a stick, and a key drive), a floppy (registered trademark) disk, and a magnetic strip. The above-described recording medium may be a database or a server including at least one of the storage device 1002 and/or the auxiliary storage device 1003, or may be any other appropriate medium.

The communication device 1004 is hardware (a transmitting/receiving device) that performs communication between computers via a wired and/or wireless network, and may be referred to as a network device, a network controller, a network card, or a communication module. The communication device 1004 may include a radio frequency switch, a duplexer, a filter, a frequency synthesizer, and the like, in order to implement at least one of frequency division duplex (FDD) and time division duplex (TDD). For example, a transmitting/receiving antenna, an amplifier unit, a transmitting/receiving unit, a transmission line interface, and the like may be implemented by the communication device 1004. The transmitting/receiving unit may be may be physically or logically separated and implemented as a transmitting unit and a receiving unit.

The input device 1005 is an input device (such as a keyboard, a mouse, a microphone, a switch, a button, or a sensor) that receives inputs from the outside. The output device 1006 is an output device (such as a display, a speaker, or a LED ramp) that provides outputs to the outside. Note that the input device 1005 and the output device 1006 may be an integrated device (for example, a touch panel).

Further, the devices such as the processor 1001 and the storage device 1002 are connected with each other via the bus 1007 that communicates information. The bus 1007 may be a single bus or may be different buses for different devices.

Also, each of the base station apparatus 10 and the user equipment 20 may be configured to include hardware such as a macro processor, a digital signal processor (DSP), an application-specific integrated circuit (ASIC), a programmable logic device (PLD), and a field-programmable gate array (FPGA), and a part or all of the functional blocks may be implemented by the hardware. For example, the processor 1001 may include at least one of these hardware devices.

Summary of Embodiments

As described above, according to the embodiments of the present invention, user equipment includes a control unit configured to determine a spatial reception parameter of a channel, based on quasi co-location (QCL) information related to a synchronization signal or a reference signal; and a reception unit configured to receive the channel based on the determined spatial reception parameter. In the QCL information, a QCL parameter applied to a source signal is partially or entirely different from a QCL parameter applied to a destination signal.

With the above configuration, the user equipment 20 can perform a synchronization process or beam control by assuming appropriate QCL based on QCL information between signals indicated from the base station apparatus 10. That is, the efficiency of a synchronization process can be improved in the radio communication system.

The QCL information may be defined by a plurality of source signals or a plurality of destination signals. With the above configuration, the user equipment 20 can flexibly perform a synchronization process or beam control by assuming appropriate QCL based on QCL information between a plurality of signals indicated from the base station apparatus 10.

A range of a beam, applied to the plurality of destination signals, in which received power greater than or equal to a predetermined value is detected, may be narrower than a range of a beam, applied to a source signal, in which received power greater than or equal to the predetermined value is detected, in a case where the beams are transmitted with the same transmission power at a predetermined distance. With the above configuration, the user equipment 20 can reduce the number of search times of a beam by assuming that a signal to which a wide beam is applied is a QCL source.

The range of the beam, applied to the plurality of destination signals, in which the received power greater than or equal to the predetermined value is detected, may be included in the range of the beam, applied to the source signal, in which the received power greater than or equal to the predetermined value is detected, in the case where the beams are transmitted with the same transmission power at the predetermined distance. With the above configuration, the user equipment 20 can reduce the number of search times of a beam by assuming that a signal to which a wide beam is applied is a QCL source.

The QCL information may include information indicating a QCL accuracy level or priority, and the accuracy level or priority may be defined based on ranges of beams, applied to the plurality of source signals or the plurality of destination signals, in which received power greater than or equal to a predetermined value is detected in a case where the beams are transmitted with the same transmission power at a predetermined distance. With the above configuration, the user equipment 20 can effectively select a beam in accordance with the required QCL accuracy by assuming that signals to which different beams are applied are QCL sources.

Further, as described above, according to an embodiment of the present invention, a communication method includes determining a spatial reception parameter of a channel, based on quasi co-location (QCL) information related to a synchronization signal or a reference signal; and receiving the channel based on the determined spatial reception parameter. In the QCL information, a QCL parameter applied to a source signal is partially or entirely different from a QCL parameter applied to a destination signal.

With the above configuration, the user equipment 20 can perform a synchronization process or beam control by assuming appropriate QCL based on QCL information indicated from the base station apparatus 10. That is, the efficiency of a synchronization process can be improved in the radio communication system.

Supplements to Embodiments

Although the embodiments of the present invention have been described above, the disclosed invention is not limited to the above-described embodiments, and persons skilled in the art will appreciate various variations, modifications, alternatives, replacements, and the like. Specific examples of numerical values are used in the description in order to facilitate understanding of the present invention. However, these numerical values are merely examples, and any other appropriate values may be used, unless otherwise specified. Classifications of items in the above description are not essential to the present invention. Depending on necessity, subject matter described in two or more items may be combined and used, and subject matter described in an item may be applied to subject matter described in another item (as long as no contradiction occurs). A boundary of a functional unit or a processing unit in the functional block diagrams does not necessarily correspond to a boundary of a physical component. Operations of a plurality of functional units may be physically executed by a single component, or an operation of a single functional unit may be physically executed by a plurality of components. The orders of the procedures described in the embodiments may be changed as long as no contradiction occurs. For the convenience of description, the base station apparatus 10 and the user equipment 20 have been described by using the functional block diagrams; however, such devices may be implemented in hardware, software, or combinations thereof. Software executed by the processor included in the base station apparatus 10 in accordance with the embodiments of the present invention and software executed by the processor included in the user equipment 20 in accordance with the embodiments of the present invention may be stored in any appropriate storage medium, such as a random-access memory (RAM), a flash memory, a read-only memory (ROM), an EPROM, an EEPROM, a register, a hard disk drive (HDD), a removable disk, a CD-ROM, a database, and a server.

Notification of information is not limited to the aspects/embodiments described herein and may be performed in any other manner. For example, information may be indicated by physical layer signaling (for example, downlink control information (DCI) and uplink control information (UCI)), higher layer signaling (for example, radio resource control (RRC) signaling, medium access control (MAC) signaling, broadcast information (master information block (MIB), and system information block (SIB))), any other signal, or a combination thereof. Further, the RRC signaling may be referred to as an RRC message, and may be an RRC connection setup message or an RRC connection reconfiguration message.

The aspects/embodiments disclosed herein may be applied to at least one of systems that utilize Long-Term Evolution (LTE), LTE-Advanced (LTE-A), SUPER 3G, IMT-Advanced, 4G, 5G, Future Radio Access (FRA), NR (New Radio), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, UWB (ultra-wideband), Bluetooth (registered trademark), any other appropriate system, and a next-generation system enhanced based on the above systems.

The orders of procedures, sequences, and flowcharts of the aspects/embodiments described in this specification may be changed, as long as no contradiction occurs. For example, in a method described in this specification, various steps are presented in an exemplary order, and is not limited to a specific order presented.

Certain operations described as being performed by the base station apparatus 10 may be performed by its upper node, in some cases. In a network including one or more network nodes having the base station apparatus 10, it is apparent that various operations performed for communication with the user equipment 20 may be performed by at least one of the base station apparatus 10 and a network node other than the base station apparatus 10 (for example, a mobility management entity (MME) or a serving-gateway (S-GW) may be assumed, but the network node is not limited thereto). Although an example, in which there is one network node other than the base station apparatus 10, has been described, multiple other network nodes (for example, MMEs and S-GWs) may be used in combination.

Information, signals, or the like may be output from the upper layer (or the lower layer) to the lower layer (or the upper layer). Information, signals, or the like may be input/output via a plurality of network nodes.

Input/output information and the like may be stored in a specific location (for example, a memory) or managed by a management table. Input/output information and the like may be overwritten, updated, or added. Output information and the like may be deleted. Input information and the like may be transmitted to other devices.

According to the present disclosure, the determination may be made by a value (0 or 1) represented by one bit, may be made by a Boolean value (Boolean: true or false), and may be made by comparison of numerical values (comparison with a predetermined value, for example).

Software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like, regardless of whether the software is referred to as software, firmware, middleware, microcode, hardware description language, or any other name.

Furthermore, software, instructions, information, and the like may be transmitted and received via a transmission medium. For example, when the software is transmitted from a website, server, or any other remote source, using at least one of a wired technology (such as a coaxial cable, a fiber optic cable, a twisted pair, and a digital subscriber line (DSL)) and a wireless technology (such as infrared and microwaves), these wired and/or wireless technologies are included within the definition of the transmission medium.

Information, signals, and the like as described herein may be represented with use of any of various different techniques. For example, data, an instruction, a command, information, a signal, a bit, a symbol, and a chip that may be referred to throughout the above description may be represented by a voltage, a current, an electromagnetic wave, a magnetic field, a magnetic particle, an optical field, a photon, or any combination thereof.

Terms described herein and terms necessary to understand the present disclosure may be replaced with terms having the same or similar meanings. For example, at least one of a channel and a symbol may be a signal. In addition, the signal may be a message. Further, a component carrier (CC) may be referred to as a carrier frequency, a cell, or a frequency carrier.

As used herein, the terms "system" and "network" are interchangeably used.

Further, information, parameters, and the like described herein may be represented as absolute values, may be represented as relative values from predetermined values, or may be represented as other corresponding information. For example, a radio resource may be specified by an index.

Names used for the above-described parameters are not intended to be restrictive in any way. Further, there may be a case where formulas using these parameters may be different from those explicitly disclosed herein. Various channels (such as a PUCCH and a PDCCH) and information elements can be identified with any names, and names assigned to these various channels and information elements are not intended to be restrictive in any way.

In the present disclosure, the terms such as "base station (BS)", "radio base station", "base station apparatus", "fixed Station", "Node B", "eNode B (eNB)", "gNode B (gNB)", "access point", "transmission/reception point", "cell", "sector", "cell group", "carrier", and "component carrier" may be used interchangeably. The base station may be referred to as a macro cell, a small cell, a femtocell, a picocell, or any other term.

A base station can accommodate one or more (three, for example) cells. If the base station accommodates multiple cells, the whole coverage area of the base station can be segmented into multiple smaller areas, and the smaller areas can each provide a communication service by using a base station subsystem (such as a remote radio head (RRH), which is an indoor small base station). The term "cell" or "sector" refers to a part of or the entirety of the coverage area of at least one of a base station and a base station subsystem providing a communication service in this coverage.

In the present disclosure, the terms such as "mobile station (MS)", "user terminal", "user equipment (UE)", and "terminal" may be used interchangeably.

A mobile station may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate term.

At least one of the base station and the mobile station may be referred to as a transmitting device, a receiving device, a communication device, or the like. At least one of the base station and the mobile station may be a device mounted on a mobile body, the moving body itself, or the like. The moving body may be a vehicle (such as a car or an airplane, for example), a moving body that moves unmanned (such as a drone or an autonomous vehicle, for example), or a robot (manned or unmanned). At least one of the base station and the mobile station also includes a device that does not necessarily move during communication operations. For example, at least one of the base station and the mobile station may be an Internet of Things (IoT) device such as a sensor.

The base station in the present disclosure may be replaced with the user terminal. For example, each aspect/embodiment of the present disclosure may be applied to a configuration such that the communication between the base station and the user terminal is replaced with communication between a plurality of user terminals (which may be referred to as device-to-device (D2D) communication, vehicle-to-everything (V2X) communication, or the like). In this case, the functions of the above-described base station apparatus 10 may be included in the user equipment 20. Additionally, the terms such as "uplink" and "downlink" may be replaced with terms corresponding to inter-terminal communication (e.g., "side"). For example, an uplink channel, a downlink channel may be replaced with a side channel.

Similarly, the user terminal in the present disclosure may be replaced with the base station. In this case, the functions included in the above-described user terminal may be included in the base station.

As used herein, the terms "determining" and "deciding" may include various types of operations. For example, "determining" and "deciding" may include determining that calculating, computing, processing, deriving, investigating, looking up (for example, looking up a table, a database, or any other data structure), or ascertaining is considered to be performed. Also, the term "determining" may include deeming that a result of judging, calculating, computing, processing, deriving, investigating, looking up (e.g., search in a table, a database, or another data structure), or ascertaining is determined or decided. Furthermore, "determining" and "deciding" may include deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided. Further, "determining (deciding)" may be replace with "assuming", "expecting", or "considering".

The terms "connected", "coupled", or any variation thereof mean any direct or indirect connection or coupling between two or more elements, and may include the presence of one or more intermediate elements between the two elements "connected" or "coupled" to each other. The coupling or connection between the elements may be physical, logical or a combination thereof. For example, "connected" may be replaced with "access". As used herein, two elements can be considered to be mutually "connected" or "coupled" by using at least one of one or more wires, cables and printed electrical connections, and, as some non-limiting and non-inclusive examples, by using electromagnetic energy such as electromagnetic energy with a wavelength in a radio frequency range, a microwave range, and an optical range (both visible and invisible).

The reference signal may be abbreviated as RS, and may be referred to as a pilot according to applicable standards.

As used herein, the term "based on" does not mean "based only on", unless otherwise specified. In other words, the term "based on" means both "based only on" and "based at least on".

Any reference to elements that use terms such as "first" and "second" used herein does not generally limit the amount or order of these elements. These terms can be used in the present disclosure as a convenient way to distinguish between two or more elements. Accordingly, the reference to the first and second elements does not mean that only two elements can be employed, or does not mean that the first element must precede the second element in any fashion.

The term "means" used in a configuration of each apparatus as described above may be replaced with "unit", "circuit", "device", or the like.

As long as the terms "include", "including", and any variation thereof are used in the present disclosure, these terms are intended to be inclusive similar to the term "comprising". Further, the term "or" used in the present disclosure is intended not to be "exclusive or".

A radio frame may be configured by one or more frames in a time domain. In the time domain, the one or more frames may be referred to as subframes. The subframes may be each configured by one or more slots in the time domain. Further, a subframe may be a fixed time length (e.g., 1 ms) that does not depend on numerology.

The numerology may be a communication parameter to be applied to at least one of transmission or reception of a signal or a channel. The numerology may represent, for example, at least one of a subcarrier spacing (SCS), a bandwidth, a symbol length, a cyclic prefix length, a transmission time interval (TTI), a symbol number per TTI, a radio frame configuration, a specific filtering process performed by a configuration unit/receiver in the frequency domain, and a specific windowing process performed by a configuration unit/receiver in a time domain.

A slot may be configured by one or more symbols (such as orthogonal frequency division multiplexing (OFDM) symbols or single carrier frequency division multiple access (SC-FDMA) symbols) in a time domain. A slot may be a unit of time based on the numerology.

A slot may include a plurality of mini-slots. In a time domain, each mini-slot may be configured by one or more symbols. A mini-slot may be referred to as a sub-slot. A mini-slot may be configured by fewer symbols than those of a slot. A PDSCH (or PUSCH) transmitted in a unit of time that is greater than a mini-slot may be referred to as "PDSCH (or PUSCH) mapping type A". A PDSCH (or PUSCH) transmitted using a mini-slot may be referred to as "PDSCH (or PUSCH) mapping type B".

A radio frame, a subframe, a slot, a mini-slot, and a symbol each represent a time unit for transmitting a signal. The radio frame, the subframe, the slot, the mini-slot, and the symbol may be denoted by respective different names.

For example, one subframe may be referred to as a transmission time interval (TTI), a plurality of consecutive subframes may be referred to as a TTI, or one slot or one mini-slot may be referred to as a TTI. Namely, at least one of a subframe and a TTI may be a subframe (1 ms) in the existing LTE, may be a time interval shorter than 1 ms (e.g., 1 to 13 symbols), or a time interval longer than 1 ms. Note that the unit representing a TTI may be referred to as a slot, a mini-slot, or the like, instead of a subframe.

For example, a TTI refers to the minimum time unit for scheduling in radio communication. For example, in the LTE system, the base station performs scheduling for allocating radio resources (such as a frequency bandwidth and transmission power that can be used in each user equipment 20) in units of TTIs to each of the user equipment 20. Note that the definition of "TTI" is not limited the above.

A TTI may be a transmission time unit, such as a channel-coded data packet (transport block), a code block, or a codeword, or may be a processing unit for scheduling or link adaptation. Note that, when a TTI is provided, a time interval (e.g., a symbol number) onto which a transport block, a code block, or a code ward is actually mapped may be shorter than the TTI.

Note that, when one slot or one mini-slot is referred to as a TTI, one or more TTIs (i.e., one or more slots or one or more mini-slots) may be the minimum time unit for scheduling. Additionally, the number of slots (the number of mini-slots) forming the minimum time unit for scheduling may be controlled.

A TTI with a time length of 1 ms may be referred to as an ordinary TTI (a TTI in LTE Rel. 8-12), a normal TTI, a long TTI, an ordinary subframe, a normal subframe, a long subframe, a slot, or the like. A TTI that is shorter than a normal TTI may be referred to as a shortened TTI, a short TTI, a partial TTI (or a fractional TTI), a shortened subframe, a short subframe, a mini-slot, a sub-slot, a slot, or the like.

Note that a long TTI (e.g., a normal TTI, a subframe, or the like) may be replaced with a TTI with a time length exceeding 1 ms, and a short TTI (e.g., a shortened TTI or the like) may be replaced with a TTI with a TTI length that is shorter than the TTI length of the long TTI and longer than or equal to 1 ms.

A resource block (RB) is a resource allocation unit in the time domain and the frequency domain, and may include one or more consecutive subcarriers in the frequency domain. A number of subcarriers included in an RB may be the same, irrespective of numerology, and may be 12, for example. The number of subcarriers included in an RB may be determined based on numerology.

Further, an RB may include one or more symbols in the time domain, and may have a length of one slot, one mini-slot, one subframe, or one TTI. Each of one TTI and one subframe may be configured by one or more resource blocks.

Note that one or more RBs may be referred to as physical resource blocks (PRBs), subcarrier groups (SCGs), resource element groups (REGs), PRB pairs, RB pairs, or the like.

Further, a resource block may be configured by one or more resource elements (REs). For example, one RE may be a radio resource area of one subcarrier and one symbol.

A bandwidth part (BWP) (which may also be referred to as a partial bandwidth, for example) may represent, in a certain carrier, a subset of consecutive common resource blocks (common RBs) for a certain numerology. As used herein, the common RB may be specified by an index of an RB when a common reference point of the carrier is used as reference. A PRB may be defined in a BWP, and may be numbered in the BWP. BWP.

A BWP may include a BWP for UL (UL BWP) and a BWP for DL (DL BWP). For the UE, one or more BWPs may be configured in one carrier.

At least one of configured BWPs may be active, and the UE is not required to assume that a predetermined signal/channel is transmitted/received outside the active BWP(s). Note that "cell", "carrier", and the like in the present disclosure may be replaced with "BWP".

The structures of the above-described radio frame, subframe, slot, mini-slot, symbol, and the like are merely examples. For example, the following configurations can be variously changed: the number of subframes included in a radio frame; the number of slots per subframe or per radio frame; the number of mini-slots included in a slot; the number of symbols and RBs included in a slot or mini-slot; the number of subcarriers included in an RB; and the number of symbols, the symbol length, the cyclic prefix (CP) length, and the like within a TTI.

In the present disclosure, for example, if articles such as "a", "an", and "the" in English are added to the translation, nouns following the articles may be plural.

In the present disclosure, the term "A and B are different" may imply that "A and B are different from each other". Note that the term may also imply "each of A and B is different from C." The terms such as "separated" and "coupled" may also be interpreted similarly.

The aspects/embodiments described herein may be used alone, may be used in combination, or may be switched at the time of execution. Furthermore, notification of predetermined information (e.g., notification of "being X") is not limited to notification that is made explicitly, and the notification may be made implicitly (by not sending notification of the predetermined information, for example).

Further, in the present disclosure, QCL-Type D is an example of QCL information. An SSB or a CSI-RS is an example of a synchronization signal or a reference signal.

Although the embodiments of the present invention have been described in detail, it will be readily apparent to those skilled in the art that the present invention is not limited to the embodiments described in the specification. Variations and modifications can be made to the present invention without departing departing from the scope of the present invention described in the claims. Accordingly, the description of the present specification is intended to provide an illustrative description and is not intended to have any restrictive meaning to the present invention.

DESCRIPTION OF THE REFERENCE NUMERALS 10 base station apparatus
110 configuration unit
120 reception unit
130 configuration unit
140 control unit
20 user equipment
210 configuration unit
220 reception unit
230 configuration unit
240 control unit
1001 processor
1002 storage device
1003 auxiliary storage device
1004 communication device
1005 input device
1006 output device

The invention claimed is:

1. A communication method comprising:
determining a spatial reception parameter of a channel, based on quasi co-location (QCL) information related to a synchronization signal or a reference signal; and
receiving the channel based on the determined spatial reception parameter,
wherein, in the QCL information, a QCL parameter applied to a source signal is partially or entirely different from a QCL parameter applied to a destination signal,
wherein the QCL information is defined by a plurality of source signals or a plurality of destination signals, and
wherein the QCL information includes information indicating a QCL accuracy level or priority, and the accuracy level or priority is defined based on ranges of beams, applied to the plurality of source signals or the plurality of destination, signals, in which received power greater than or equal to a predetermined value is detected in a case where the beams are transmitted with a same transmission power at a predetermined distance.

2. User equipment comprising:

a processor configured to determine a spatial reception parameter of a channel, based on quasi co-location (QCL) information related to a synchronization signal or a reference signal; and a receiver configured to receive the channel based on the determined spatial reception parameter, wherein, in the QCL information, a QCL parameter applied to a source signal is partially or entirely different from a QCL parameter applied to a destination signal, wherein the QCL information is defined by a plurality of source signals or a plurality of destination signals, and wherein the QCL information includes information indicating a QCL accuracy level or priority, and the accuracy level or priority is defined based on ranges of beams, applied to the plurality of source signals or the plurality of destination, signals, in which received power greater than or equal to a predetermined value is detected in a case where the beams are transmitted with a same transmission power at a predetermined distance.

3. The user equipment according to claim 2, wherein a range of a beam, applied to the plurality of destination signals, in which received power greater than or equal to a predetermined value is detected, is narrower than a range of a beam, applied to a source signal, in which received power greater than or equal to the predetermined value is detected, in a case where the beams are transmitted with a same transmission power at a predetermined distance.

4. The user equipment according to claim 3, wherein the range of the beam, applied to the plurality of destination signals, in which the received power greater than or equal to the predetermined value is detected, is included in the range of the beam, applied to the source signal, in which the received power greater than or equal to the predetermined value is detected, in the case where the beams are transmitted with the same transmission power at the predetermined distance.

\* \* \* \* \*